United States Patent
Bard et al.

[11] Patent Number: 5,374,817
[45] Date of Patent: * Dec. 20, 1994

[54] PRE-OBJECTIVE SCANNER WITH FLEXIBLE OPTICAL SUPPORT

[75] Inventors: Simon Bard, Stony Brook; Yajun Li, Oakdale; Jerome Swartz, Old Field; Boris Metilitsky; Joseph Katz, both of Stony Brook; Askold Stratienco, Patchogue; Hal Charych, East Setauket, all of N.Y.

[73] Assignee: Symbol Technologies, Inc., Bohemia, N.Y.

[*] Notice: The portion of the term of this patent subsequent to Sep. 1, 2009 has been disclaimed.

[21] Appl. No.: 897,664
[22] Filed: Jun. 12, 1992

Related U.S. Application Data

[63] Continuation-in-part of Ser. No. 787,458, Nov. 4, 1991, abandoned, which is a continuation-in-part of Ser. No. 699,417, May 13, 1991, Pat. No. 5,191,197, which is a continuation-in-part of Ser. No. 193,265, May 11, 1988, Pat. No. 5,144,120.

[51] Int. Cl.[5] .................................... G06K 7/10
[52] U.S. Cl. ........................... 235/462; 359/210
[58] Field of Search ............ 359/198, 199, 209, 210; 235/462, 472

[56] References Cited

U.S. PATENT DOCUMENTS

| | | | |
|---|---|---|---|
| 1,438,974 | 12/1922 | Wente . | |
| 1,980,888 | 11/1934 | Thomas . | |
| 2,290,529 | 1/1960 | Blythe . | |
| 3,508,814 | 4/1970 | Aas . | |
| 3,532,408 | 10/1970 | Dostal . | |
| 3,544,201 | 12/1970 | Fowler et al. . | |
| 3,612,642 | 10/1971 | Dostal . | |
| 3,614,677 | 10/1971 | Willfinger . | |
| 3,700,304 | 10/1972 | Dostal et al. . | |
| 3,758,199 | 9/1973 | Thaxter . | |
| 3,794,410 | 2/1974 | Elliott . | |
| 3,902,783 | 9/1975 | Bodlaj . | |
| 3,981,566 | 9/1976 | Frank et al. . | |
| 3,988,092 | 12/1976 | Maccabee . | |
| 4,025,203 | 5/1977 | Lee . | |
| 4,170,397 | 10/1979 | Botcherby . | |
| 4,251,798 | 2/1981 | Swartz et al. | 235/462 |
| 4,360,798 | 11/1982 | Swartz et al. | 235/463 |
| 4,369,361 | 1/1983 | Swartz et al. | 235/470 |
| 4,387,297 | 6/1983 | Swartz et al. | 235/462 |
| 4,409,470 | 10/1983 | Shepard et al. | 235/472 |
| 4,436,364 | 3/1984 | Lauer et al. . | |
| 4,460,120 | 7/1984 | Shepard et al. | 235/472 |
| 4,496,831 | 1/1985 | Swartz et al. | 235/472 |
| 4,577,131 | 3/1986 | Sobbitsky | 310/328 |
| 4,593,186 | 6/1986 | Swartz et al. | 235/472 |
| 4,607,156 | 8/1986 | Koppenaal et al. | 235/472 |
| 4,673,803 | 6/1987 | Zerle et al. | 235/436 |
| 4,708,420 | 11/1987 | Liddiard . | |
| 4,736,095 | 4/1988 | Shepard et al. | 235/472 |
| 4,758,717 | 7/1988 | Shepard et al. | 235/472 |
| 4,760,248 | 7/1988 | Swartz et al. | 235/472 |
| 4,769,803 | 9/1988 | Yamamiya | 359/210 |
| 4,775,815 | 10/1988 | Heinz | 310/328 |
| 4,778,233 | 10/1988 | Christenson et al. . | |
| 4,784,448 | 11/1988 | Sepp et al. . | |
| 4,806,742 | 2/1989 | Swartz et al. | 235/472 |
| 4,808,804 | 2/1989 | Krichever et al. | 235/462 |
| 4,816,660 | 3/1989 | Swartz et al. | 235/472 |
| 4,816,661 | 3/1989 | Krichever et al. | 235/472 |
| 4,845,350 | 7/1989 | Shepard et al. | 235/472 |
| 4,871,904 | 10/1989 | Metlitsky et al. | 235/467 |
| 4,902,083 | 2/1990 | Wells . | |
| 4,923,281 | 5/1990 | Krichever et al. . | |
| 5,015,831 | 5/1991 | Eastman et al. | 359/198 |
| 5,047,625 | 9/1991 | Iima et al. | 250/216 |
| 5,170,277 | 12/1992 | Bard et al. | 359/210 |

OTHER PUBLICATIONS

'Shea, D., "Modulation and Scanning," *Elements of Modern Optical Design*, pp. 284–285.

Primary Examiner—John Shepperd

[57] ABSTRACT

To reduce the size and weight of an optical scanner, the present invention provides a mirrorless beam scanning unit. A flexible support structure, such as one or more strips of mylar, movably mounts the objective lens in front of the light emitter. The objective lens is laterally reciprocated in response to a motive force, for example as might be applied by a combination of a permanent magnet coupled to the objective lens and a fixedly mounted electromagnet driven by an alternating current signal. Reciprocation of the objective lens during emission of light by the light emitter causes the light to scan a surface, such as a surface bearing a bar code label.

39 Claims, 7 Drawing Sheets

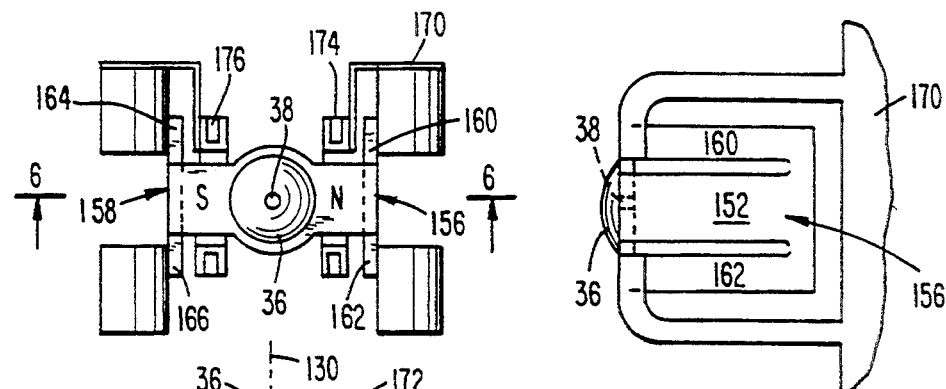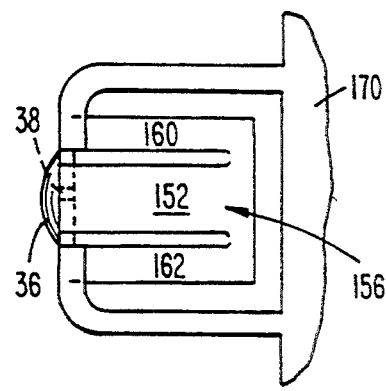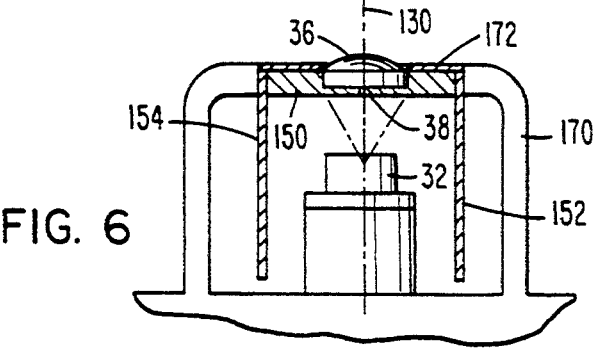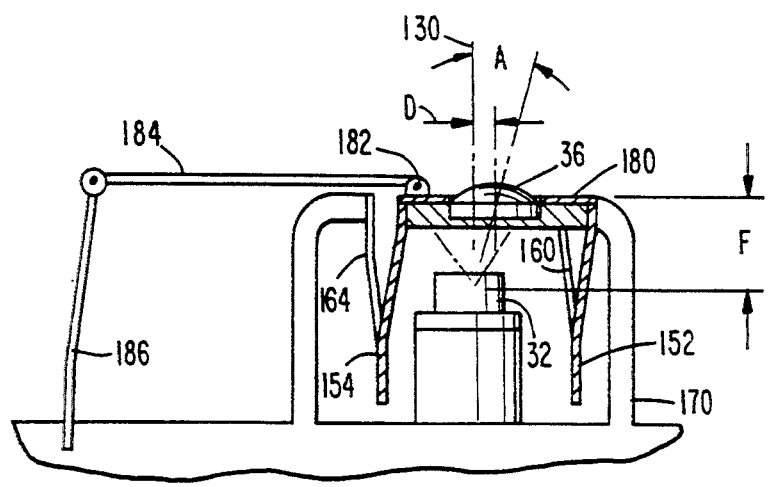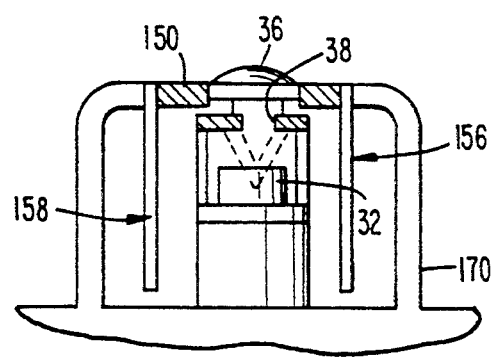

PRE-OBJECTIVE SCANNER WITH FLEXIBLE OPTICAL SUPPORT

CROSS REFERENCE TO RELATED APPLICATIONS

This application is a continuation-in-part of pending application Ser. No. 07/787,458 filed on Nov. 4, 1991 now abandoned, which is in turn a continuation-in-part of application Ser. No. 07/699,417 filed on May 13, 1991 now U.S. Pat. No. 5,191,197, which is in turn a continuation-in-part of application Ser. No. 07/193,265 filed May 11, 1988 now U.S. Pat. No. 5,144,120, all of which are herein entirely incorporated by reference.

TECHNICAL FIELD

The present invention relates to optical scanners for optically reading information, such as bar codes. In particular, this invention relates to small light weight scanner structures which do not require a moving mirror to scan a light beam across the information.

BACKGROUND ART

Optical readers, such as bar code readers, are now quite common. Typically, a bar code comprises a series of encoded symbols, and each symbol consists of a series of light and dark regions, typically in the form of rectangles. The widths of the dark regions, the bars, and/or the widths of the light spaces between the bars indicate the encoded information. A bar code reader illuminates the code and senses light reflected from the code to detect the widths and spacings of the code symbols and derive the encoded data.

Bar code reading type data input systems improve the efficiency and accuracy of data input for a wide variety of applications. The ease of data input in such systems facilitates more frequent and detailed data input, for example to provide efficient inventories, tracking of work in progress, etc. To achieve these advantages, however, users or employees must be willing to consistently use the bar code readers. The readers therefore must be easy and convenient to operate.

A variety of scanning devices are known. One particularly advantageous type of reader is an optical scanner which scans a beam of light, such as a laser beam, across the symbols.

Laser scanner systems and components of the type exemplified by U.S. Pat. Nos. 4,251,798; 4,360,798; 4,369,361; 4,387,297; 4,593,186; 4,496,831; 4,409,470; 4,460,120; 4,607,156; 4,673,803; 4,736,095; 4,758,717; 4,816,660; 4,808,804; 4,816,661; 4,760,248; 4,871,904; 4,806,742; and 4,845,350, as well as U.S. application Ser. Nos. 07/148,669 and 07/147,708—all of these patents and patent applications being owned by the assignee of the instant invention and being incorporated by reference herein—have generally been designed to read indicia having parts of different light reflectivity, e.g., bar code symbols, particularly of the Universal Product Code (UPC) type, at a certain working or reading distance from a handheld or stationary scanner.

In a typical optical scanner system, a light source such as a laser generates a light beam which is optically modified to form a beam spot of a certain size at the working distance and is directed by optical components along a light path toward a bar code symbol located in the vicinity of the working distance for reflection from the symbol. A photodetector having a field of view extending across and slightly past the symbol detects light of variable intensity reflected off the symbol and generates electrical signals indicative of the detected light. A scanning component is situated in the light path. The scanning component may either sweep the beam spot across the symbol and trace a scan line across and past the symbol, or scan the field of view of the photodetector, or do both.

A digitizer, associated with or included in the scanner, processes the analog signal to produce a pulse signal where the widths and spacings between the pulses correspond to the widths of the bars and the spacings between the bars. The digitizer serves as an edge detector or wave shaper circuit, and the threshold value set by the digitizer determines what points of the analog signal represent bar edges. The pulse signal from the digitizer is applied to a decoder. The decoder first determines the pulse widths and spacings of the signal from the digitizer. The decoder then analyzes the widths and spacings to find and decode a legitimate bar code message. This includes analysis to recognize legitimate characters and sequences, as defined by the appropriate code standard. This may also include an initial recognition of the particular standard the scanned symbol conforms to. This recognition of the standard is typically referred to as autodiscrimination.

Often the particular application for the bar code reader requires that the optical scanner be constructed in the form of a handheld unit, typically in the form of a pistol. The user points the scanner at the object and operates a trigger to activate the scanning of the bar code. In these handheld units, a light source, such as a visible laser diode (hereinafter VLD) emits a beam of light. To scan the beam across an image, the beam is reflected from a mirror and the mirror is moved in an oscillatory fashion. The oscillation of the mirror causes the reflected beam to scan back and forth in a desired pattern. For example, U.S. Pat. No. 4,251,798 discloses a rotating polygon having a planar mirror at each side, each mirror tracing a scan line across the symbol. U.S. Pat. Nos. 4,387,297 and 4,409,470 both employ a planar mirror which is repetitively and reciprocally driven in alternate circumferential directions about a drive shaft on which the mirror is mounted. U.S. Pat. No. 4,816,660 discloses a multi-mirror construction composed of a generally concave mirror portion and a generally planar mirror portion. The multi-mirror construction is repetitively reciprocally driven in alternate circumferential directions about a drive shaft on which the multi-mirror construction is mounted.

In optical scanners of the type discussed above, the mirror and means to oscillate the mirror add size and weight to the handheld scanner. In applications involving protracted use, a large heavy handheld unit can produce fatigue. When use of the scanner produces fatigue or is in some way inconvenient, the user is reluctant to operate the scanner, which defeats the data gathering purposes for which bar code systems are intended.

Another problem with scanners of the type discussed above relates to the scan field and the size of the spot at the point where the beam impacts on the information. In scanning applications, such as reading bar codes, it is important to maintain the spot size of the beam on the scanned surface essentially at a constant across the entire length of the scanned information. Lasers emit a narrow core of radiation referred to as the laser beam. The beam cross-section varies as the laser beam propagates, particularly after focusing thereof by a lens. The minimum beam diameter is called the "beam waist." In the prior art, the scanning element, e.g. the moveable mirror, typically is positioned after the objective lens so as to scan the focused beam. Such scanning is referred to as "post objective" scanning. The objective lens in such scanners only needs to be slightly larger than the beam, and the scanning mirror can be somewhat smaller than the beam diameter. The mirror rotation, however, produces a curved or arcuate scan of the focal point of the beam. This curved scan field means that the focal point of the beam actually moves into and out of the plane of the information being scanned, and the part of the beam which impacts the plane of the information changes. Consequently, the spot size changes substantially from point to point along the scan line on the information surface. Such variations in spot size cause the intensity of light reflection sensed by the photodetector to vary, which may interfere with accurate sensing of reflection variations due to variations in the scanned information.

In non-laser scanning systems of the type exemplified by U.S. Pat. No. 4,578,571, a non-laser light emitting diode, an optical assembly, a photodetector, and electronic preamplifier/filter circuitry are all fixedly mounted on a common support that is connected to a cantilevered bimorph which is reciprocally driven to jointly move all the aforementioned components back and forth over a bar code symbol to be scanned. The large volume and heavy mass of all the commonly mounted non-laser system components require the expenditure of a great deal of power for the driver. This is not altogether practical in those cases, e.g. battery-powered operation, where power consumption is to be held to a minimum. Also, moving only one or more non-mirrored system components relative to another for conserving power was heretofore not considered desirable, because of optical alignment problems.

The components for the light scanning system, including the light source, optics, photo-detector, scanning component and an electrical conductor, can be mounted together in a common assembly to constitute a compact, lightweight, scan module. Such a scan module is mounted in an interchangeable, modular manner in housings of different configurations. For example, the housing can be hand-held and shaped as a cylinder in a so-called flashlight-type configuration, or shaped as a box, or shaped with a gun-like configuration. The housing can be mounted on the back of an operator's arm (see, for example, U.S. Pat. No. 4,766,299) or on one or more fingers of the operator's hand, typically with the aid of a strap, a clip, or a glove. The housing can be mounted on a countertop workstation. The housing can be mounted in a mobile cart, or shopping cart, or, in some cases, even in a stationary installation.

Commonly assigned application Ser. No. 07/193,265 filed May 11, 1988 discloses a mirrorless optical scanner, and application Ser. No. 07/699,417 filed on May 13, 1991 discloses incorporation of such a scanner in a modular scanner component system facilitating use of the scanner in a variety of different housing configurations.

A need still exists, however, to further reduce the size and weight of the scanner unit and to provide a particularly convenient scanner system. The mass of the moving components should be as low as possible to minimize the power required to produce the scanning movement and to facilitate operation at high scanning speeds.

DISCLOSURE OF THE INVENTION

OBJECTIVE

The objective of this invention is to provide a scanner which is smaller and lighter weight, particularly when held by an operator, and which is easier to manipulate to scan encoded data.

A further objective is to produce a durable robust scanning system at a relatively low cost.

To reduce weight and achieve a higher degree of miniaturization, it is a specific object of this invention to eliminate the mirror from the optical scanner.

Another objective of the invention is to reduce the mass of the components which actually move to scan the beam. This mass reduction reduces the power required to produce the movement and facilitates operation of the scanner at high scanning frequencies.

A further objective of the invention is to design the optics and scanning system to automatically compensate for variations in the beam spot size at the point the beam impacts on the surface of the optically encoded information due to the curved field produced by the motion of the scanning element.

SUMMARY

In one aspect, the invention is a mirrorless optical scanner including a light emitter and an objective lens for focusing light from the emitter on a surface of information to be scanned. A flexible member movably supports the objective lens in front of the light emitter. The flexible member permits lateral movement of the objective lens with respect to light from the light emitter. The scanner also includes means for laterally reciprocating the objective lens during emission of light by the light emitter to cause the light to scan the surface.

The objective scanning using the flexible member to support the objective lens provides a small light weight scanner. Also, the mass of the moving components is small to facilitate low power operation and operation at high scanning speeds. The objective lens can be a condenser lens of glass or plastic; however, to further reduce size and mass, the invention uses a fresnel lens.

A number of different structures can serve as the flexible member for supporting the lens. For example, the lens could be supported by a pair of convoluted diaphragm springs or a so-called spider spring. In the presently preferred form, the flexible member comprises a pair of flexible strips made from MYLAR RTME. The lens is supported between edges of the flat mylar strips at a moveable end of the strips. The opposite ends of the strips are secured to a relatively fixed structure, e.g., a point on a chassis. The mylar film strip construction of the flexible means for mounting the lens provides a relatively inexpensive and durable type of flexible structure.

The invention also includes a number of arrangements for providing the necessary aperture stop. In one embodiment, part of the lens support structure forms the aperture. As a result, the aperture reciprocates with the lens. Alternate embodiments include a fixed position aperture. The fixed aperture plate can be mounted in front of the lens, or the fixed aperture plate can be mounted between the front of the laser diode and the rear surface of the objective lens.

The means for laterally reciprocating the lens can take a number of different forms but preferably comprise a permanent magnet and a coil held in a fixed position in proximity to the permanent magnet. When an alternating current signal is applied to the electromagnet it produces a magnetic field which acts on the permanent magnet to oscillate the permanent magnet and the attached lens. This magnetic drive system can be quite small and light weight, yet it operates at high frequencies in response to low power drive signals.

In a second aspect, the present invention consists of an improvement in an optical scanning system for emitting light and scanning the light across a surface. The improvement comprises at least one flexible strip for mounting an optical component of the scanning system, such as an objective lens, to allow reciprocal movement. This aspect of the invention also includes means to laterally move the optical component so that the light scans across the surface.

A further embodiment of the invention provides two dimensional scanning. In the two dimensional scanner, the basic one dimensional scanner is itself mounted as a moveable assembly on a second flexible support structure, for example an additional flexible mylar film strip. A second permanent magnet is attached to the moveable assembly and a second electromagnet responds to a second alternating current signal to reciprocally move the assembly in a second direction.

In a further aspect, the inventive scanning modules are incorporated into a scanning unit. The scanning unit includes one of the above discussed modules, to produce a moving beam for optically scanning a surface on which encoded indicia of varying reflectivity are formed. The scanning unit also includes a photodetector for sensing light reflected from the scanned surface and producing a proportional electrical signal.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

FIG. 4 is a top plan view of an additional embodiment of a mirrorless scanner arrangement in accordance with this invention.

FIG. 5 is an end view of the embodiment of FIG. 4.

FIG. 6 is a sectional view taken on line 6—6 of FIG. 4.

FIG. 7 is a view analogous to FIG. 6, but of another embodiment of a mirrorless scanner arrangement in accordance with this invention.

FIG. 8 is a view analogous to FIG. 6, but of still another embodiment of a mirrorless scanner arrangement in accordance with this invention.

BEST MODE FOR CARRYING OUT THE INVENTION

Figure 1:
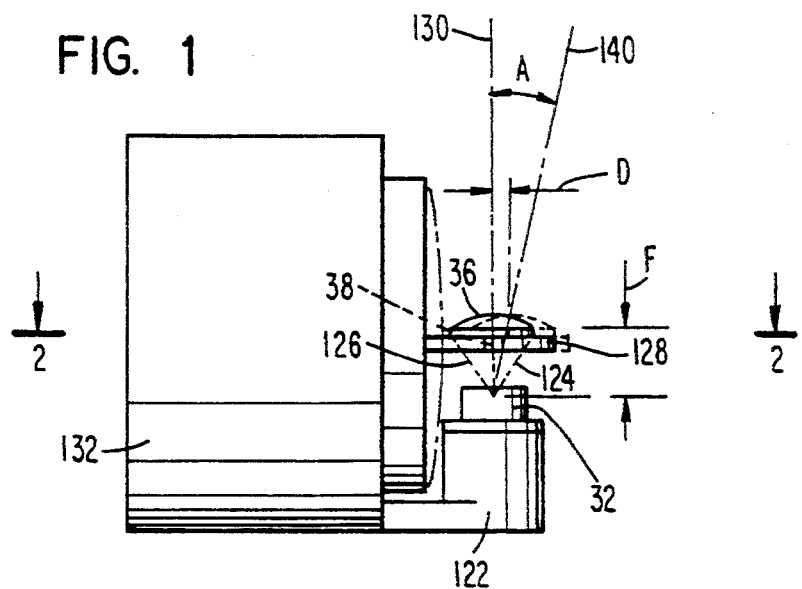
FIG. 1 is a side view of a first embodiment of a mirrorless scanner arrangement in accordance with this invention.

FIG. 1 depicts a mirrorless scanning unit 1 of the present invention. A light emitter, such as a visible laser diode or VLD, emits a beam of light to generate a scan line.

In the illustrated embodiment, the laser diode 32 is stationarily mounted on a support 122. The diode 32 emits light along optical axis 130. The emitted light takes the form of a wide-angle fan-shaped laser beam schematically represented by light rays 124, 126. The fan-shaped beam diverges at different angles in both orthogonal planes extending parallel to the plane of the diode outlet and perpendicular to the optical axis 130. The focusing lens 36 is mounted in a holder 128 at a fixed distance of focal length F as measured along axis 130, from the diode. The holder has an opening centered on the axis 130, the opening serving as the aperture stop 38.

Figure 2:
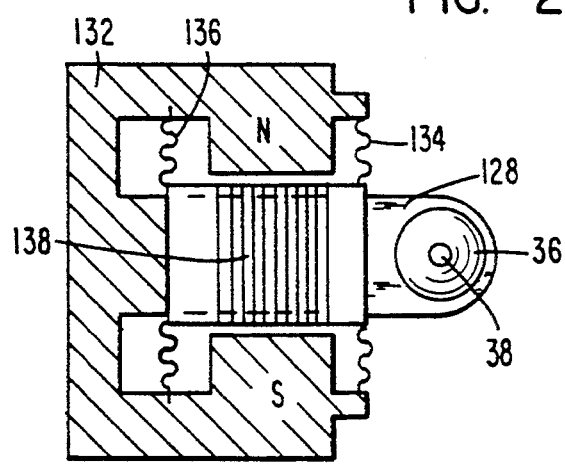
FIG. 2 is a sectional view taken along line 2—2 of FIG. 1.

The holder 128, as shown in FIG. 2, extends into a permanent magnet casing 132. A pair of convoluted diaphragm suspension springs 134, 136 support the holder 128 on the magnet casing 132. A voice coil 138 surrounds the holder 128 inside the casing 132 and is between the north N and south S poles of the magnet casing.

By electrically energizing the coil 138, the holder and, in turn, the lens and the aperture stop are made to jointly reciprocate back and forth in a plane perpendicular to axis 130 due to electromagnetic attraction and repulsion forces generated at the coil. If the deflection of the lens and aperture stop as measured from the axis 130 to one end-limiting position is denoted D, then it can be shown that the deflected laser beam represented by light ray 140 is shifted by an angular distance $A = \tan^{-1}(D/F)$.

Figure 3:
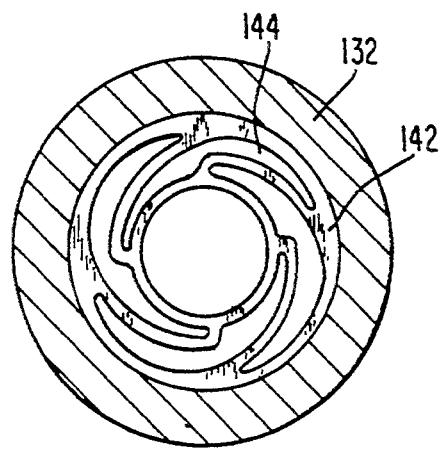
FIG. 3 is a cross-sectional view of an alternate spring for use in the embodiment of FIGS. 1 and 2.

FIG. 3 shows an alternate to the convoluted springs 134, 136. A so-called "spider" spring 142 having curved legs 144 could also be used.

FIG. 4 shows another arrangement for reciprocally shifting the lens 36 and aperture stop 38 in a plane parallel to the plane of the outlet of the diode 32. The lens 36 is mounted on a bridge support 150 (shown in FIG. 6) which spans the distance between, and is carried by, two center legs 152, 154 of E-shaped leaf springs 156, 158 (see FIG. 5). Outer legs 160, 162 of spring 156 and outer legs 164, 166 of spring 158 are stationarily connected to an overhead support frame 170.

The bridge support 150 has an opening centered on optical axis 130, the opening serving as the aperture stop 38. A permanent magnet strip 172 having a north N pole at one end and a south S pole at an opposite end is carried by the bridge support. A pair of driving coils 174, 176 surrounds each pole.

In operation, each driving coil is electrically energized. Electromagnetic attraction and repulsion forces are generated by magnetic interaction between the coils and the poles N, S, thereby causing the bridge support to be reciprocally shifted in a plane perpendicular to axis 130. FIG. 6 shows this arrangement in a center, non-shifted position. By contrast, the FIG. 7 embodiment described below illustrates a shifted position. It will be noted that only the upper ends of the center legs of the E-springs are displaced. A substantially constant distance between the lens and aperture stop combination and the diode is maintained. This arrangement maintains proper laser beam focus at the reference plane throughout the range of reciprocal displacement of the lens.

As before, the shifting of the lens and aperture stop causes the laser beam emitted by the diode to be deflected at an angle $A=\tan^{-1}(D/F)$. The beam spot is moved along an arc around a center of curvature at the lens. It is possible, by having unequal lengths or stiffnesses in the legs of the springs, to have the beam spot moved in a desired manner across the symbol. For example, the spot can be moved in a straight line.

Rather than using electromagnetic means, other means can be used to displace the lens and aperture stop. FIG. 7 shows an arrangement identical to FIG. 6, but, instead of the magnetic strip 172, a plate 180 is connected to the bridge support. The plate 180 has a lug 182 to which a drive bar 184 is pivotably connected. The bar 184 can be connected to a pure mechanical drive, an electro-mechanical drive, or a piezo-electric substrate, i.e., a transducer operative for converting electrical to mechanical energy, to effect the reciprocal movement.

In another variant, the center legs 152, 154 of the springs can be made of one bi-metallic material while the outer legs are made of another bi-metallic material. Heating all the legs would cause the center legs to be displaced relative to the outer legs.

In FIGS. 4—7, since the aperture stop 38 moves with the lens 36, the output power of the laser beam will decrease at the ends of the scan line, because the intensity of the unfocused laser beam is brightest on the axis 130. This loss of power at the ends of the scan could be compensated electrically by sensing the output power of the beam, or the light reflected off the rear surface of the aperture stop, and by adjusting the electrical supply current to the laser diode so as to maintain a constant power output.

Another approach is shown in FIG. 8, wherein the aperture stop 38 is held stationary at a point between the lens 36 and the laser diode 32, and only the focusing lens 36 is reciprocally shifted. Since the laser beam does not pass through the center of the lens 36 when the lens is shifted off axis, the deflection or scan angle A is amplified. Light passing through the lens off the axis 130 has more optical aberrations, but they have not been found to be significant for bar code reading applications.

The low mass of the moving structure, i.e., the lens alone; the lens and aperture stop together; the lens, aperture stop and diode jointly; and the lens, aperture stop, diode and photodetector jointly, enables the system to operate at resonance for low power applications, as well as off resonance. Very high scanning speeds on the order of 40 scans per second and more are obtainable due to the low mass of the moving structure.

Figure 10:
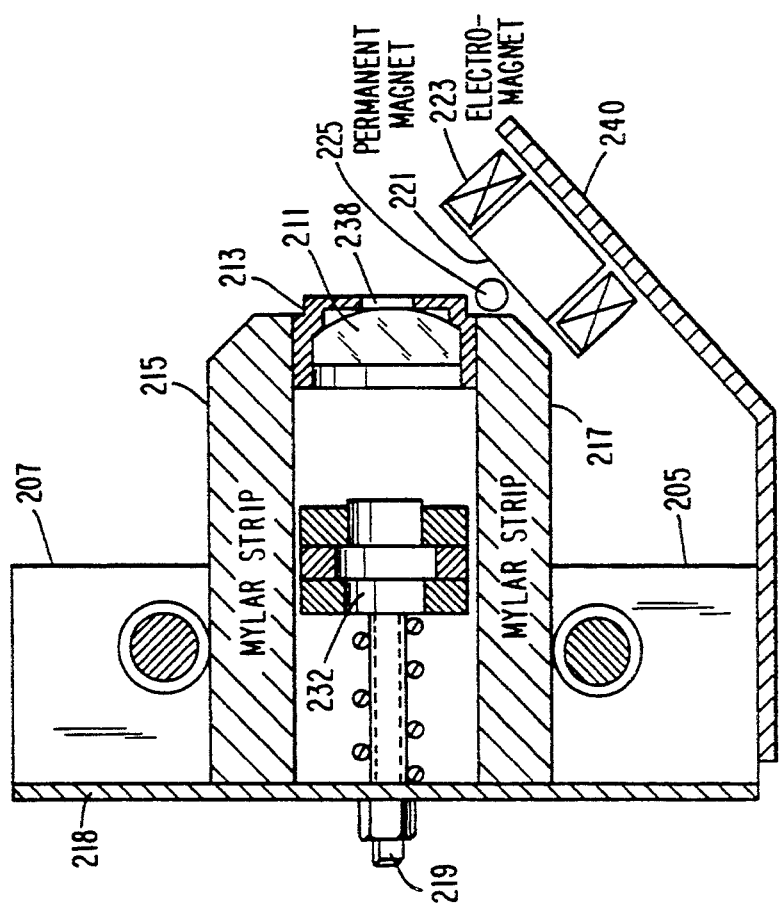
FIG. 10 is a cross-sectional view taken along line A—A of FIG. 9.

In the embodiments of FIGS. 4 and 10, the objective lens reciprocates laterally through an arc in front of the light emitter. A flexible support structure movably mounts the objective lens in front of the light emitter. In the preferred form, the flexible support structure consists of two strips of MYLAR film, but other flexible elements could be used. The flexible support provided by the two strips of MYLAR film permits lateral movement of the objective lens with respect to light from the light emitter. The lens is attached between the moveable ends of the two strips, and the opposite ends of the strips are attached to a fixed support point, for example on the scanner chassis. Flexing of the strips therefore causes the lens to move laterally through an arc. The objective lens is laterally reciprocated in response to a motive force. Reciprocation of the objective lens through an arc during emission of light by the light emitter causes the light to scan a surface, such as a surface bearing a bar code label.

Figure 9:
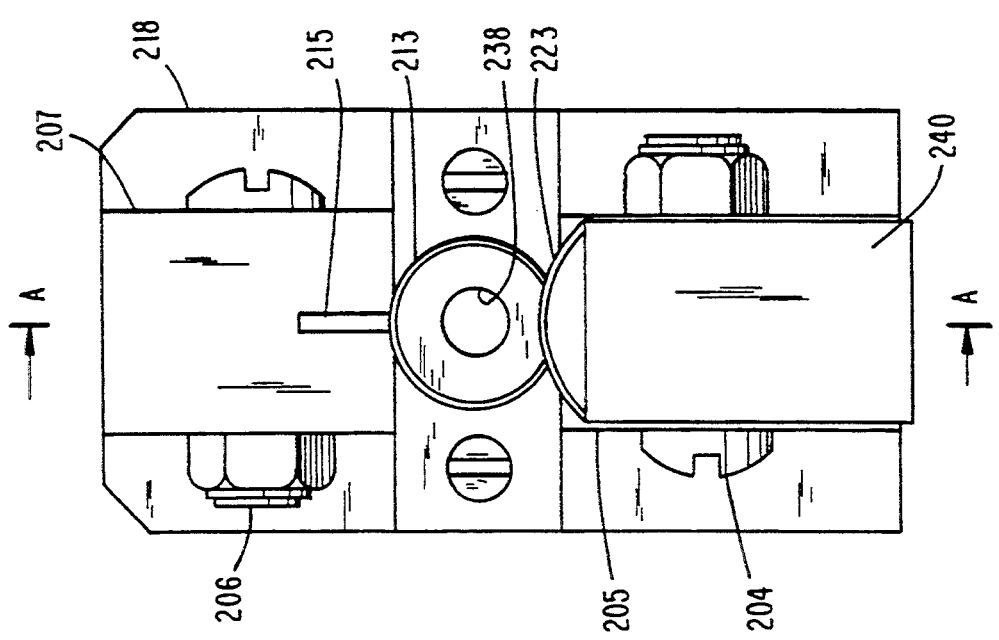
FIG. 9 is a front view of another embodiment of the invention which reciprocates the objective lens through an arc to produce beam scanning.

In the illustrated embodiment, the oscillation of the assembly is provided by the combination of a permanent magnet and an electromagnet. In the embodiments of FIGS. 9 and 10, the flexible support structure supplies the With more specific reference to FIGS. 9 and 10, a condenser lens 211 is placed in a lens holder 213 that is supported by the two pieces of MYLAR film 215 and 217. Specifically, the circular lens holder 213 is attached to an edge of each of the MYLAR film strips 215, 217 at the moveable front ends of the strips. In contrast, the lens holders in the embodiments of Figures were connected to the flat side of flexible spring strips. The opposite ends of the mylar strips 215, 217 are fixed to a chassis 218. For example, FIG. 9 shows upper and lower clamping blocks 207, 205. At least a portion of the back surface of each block is attached to the chassis 218. Tightening of bolts 206, 204 compresses clamping blocks 207, 205 on the ends of flexible MYLAR strips 215, 217 to retain the ends of those strips in fixed relation with respect to chassis 218.

A spring bolt 219 attached to the chassis 218 between the two MYLAR strips 215, 217 supports a VLD 232 which serves as the light emitter of this scanner. An opening 238 through the front of the lens holder 213 serves as the aperture stop.

In the embodiment of FIGS. 9 and 10, a core 221 comprises a bobbin around which the coil 223 is wound such that the core and coil are entirely concentric to minimize size and weight. The permanent magnet 225 is glued to the front of the lens holder 213; and an arm 240, attached to the chassis 218, supports the coil 223 and bobbin core 221 of the electromagnet in close proximity to the moveable permanent magnet 225. An alternating current signal drives the coil. The magnetic field generated by a coil 223 applies driving force to the permanent magnet 225. A laser beam from the VLD 232 mounted behind the condenser lens is deflected by the reciprocation of the condenser lens 211 when the alternating current applied to the coil causes the permanent magnet to vibrate. The beam deflection angle can be as large as ±20°.

The core 221 need not be made of a soft steel, as in the IMM discussed above. The core 221 may consist of any appropriate light weight material. When there is no current through the coil 223 the resilient nature of the two MYLAR film strips 215, 217 causes the objective condenser lens 211 to return to its central rest position, i.e. facing straight forward.

When a current is introduced through the coil 223, interaction between magnetic fields of the coil and the permanent magnet 225 creates a force causing the magnet 225 (with the attached lens 211) to move from an equilibrium position. As a result of such motion, a spring force is produced by each of the MYLAR strips which is trying to bring the permanent magnet 225 and the lens back to the rest position. Reversing the polarity of the applied current will reverse the directions of the magnetic force. Therefore., if the current applied to the coil takes the form of a cyclical AC signal, such as a sine wave, a pulse signal, a triangular wave, etc., the induced magnetic forces will produce an oscillatory movement of the permanent magnet 225 and the attached objective condenser lens. The MYLAR strips 215, 217 bend back and forth causing the lens 211 to reciprocate through an arc. The radius of the arc equals the distance between the lens 211 and the point at which clamping blocks first retain the ends of strips 215 and 217. For example, in the embodiment of FIG. 10, the fixed end or center of the radius of curvature will correspond to the front surface of the clamping blocks 205, 207.

Figure 12:
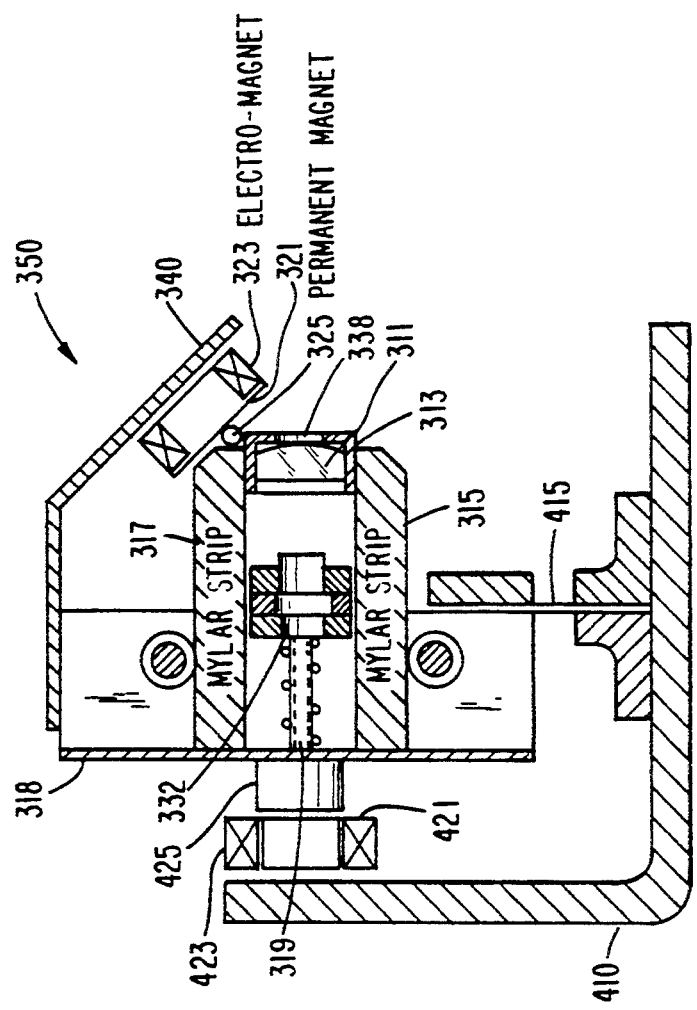
FIG. 12 is a cross-sectional view taken along line A—A of FIG. 11.
Figure 11:
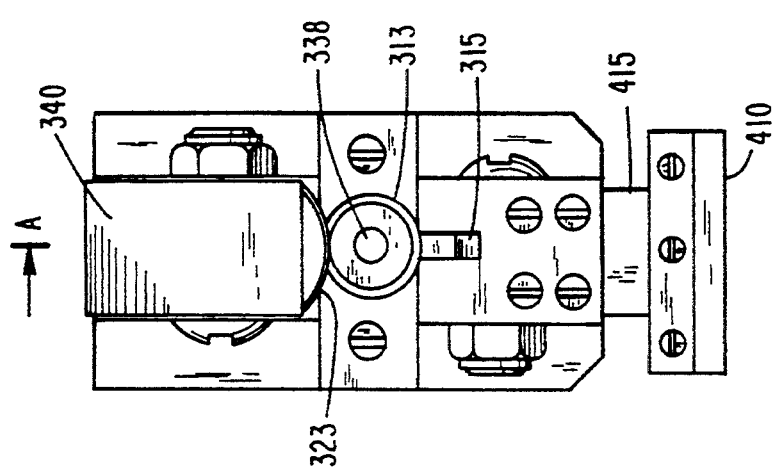
FIG. 11 is a front view of an embodiment of the invention providing two dimensional scanning.

FIGS. 11 and 12 show a mirrorless two-dimensional scanning device which is a logical further development of the one-dimensional scanning device shown in FIGS. 9 and 10. In the two-dimensional scanner, the entire chassis 318 and movable lens assembly 350, similar to the entire assembly shown in FIGS. 9 and 10, is movably supported by at least one flexible support, such as another strip of MYLAR film. An additional magnet/coil assembly is used to push the single lens system back and forth in a second direction, different from the movement direction produced by the first assembly. The two directions of reciprocal motion form the raster scan pattern.

More specifically, the embodiment of FIGS. 11 and 12 comprises a fixed chassis 410 and a moveable assembly 350. The moveable assembly 350 is essentially similar to the entire embodiment of FIGS. 9 and 10, but the moveable assembly 350 is mounted on a flexible strip of mylar film 415. The objective condenser lens 311 is placed in a lens holder 313 that is supported by the two pieces of MYLAR film 315 and 317. The lens holder 313 is attached to edges of the strips 315, 317 at the front ends of the strips. The opposite ends of the MYLAR strips 315, 317 are fixed to the chassis 318 of the moveable assembly 350. The MYLAR strips 315, 317 are oriented to flex in a direction permitting the lens to reciprocate through a horizontal arc left to right in FIG. 11. A spring bolt 319 attached to the chassis 318 between the two MYLAR strips 315 and 317 supports a VLD 332 which serves as the light emitter of this scanner.

The film strip 415 supporting the moveable assembly 350 is oriented to flex in a direction permitting reciprocation left to right in FIG. 12. As the film strip 415 flexes, the entire assembly 350 rotates through a short arc, which causes the emitted beam of light to scan in a vertical direction.

A core 321 comprises a bobbin around which the coil 323 is wound such that the core and coil are entirely concentric to minimize size and weight. The permanent magnet 325 is glued to the lens holder 313 and/or the front of mylar film strip 317. An arm 340, attached to the chassis 318 of the moveable assembly 350, supports the coil 323 and bobbin core 321 of the electromagnet in close proximity to the moveable permanent magnet 325. The core 321 may consist of any appropriate light weight material. When there is no current through the coil 323, the resilient nature of the two MYLAR film strips 315, 317 within the moveable assembly 350 causes the condenser lens 311 to return to its horizontal central rest position, i.e. facing straight forward.

When a current is introduced through the coil 323, interaction between magnetic fields of the coil and the permanent magnet 325 creates a force causing the magnet 325 (with the attached objective lens 311) to move horizontally from an equilibrium position. As a result of such motion, a spring force is produced by each of the two mylar strips 315, 317 which is trying to bring the permanent magnet 325 and the lens 311 back to the rest position. Reversing the polarity of the applied current will reverse the directions of the magnetic force. Therefore, if the current applied to the coil takes the form of a cyclical AC signal, such as a sign wave, a pulse signal, a triangular wave, etc., the induced magnetic forces will produce an oscillatory movement of the permanent magnet 325 and the attached objective condenser lens in the horizontal direction left to right in FIG. 11. The mylar strips 315, 317 bend back and forth causing objective lens 311 to reciprocate through an arc.

A core 421 also comprises a bobbin around which the coil 423 is wound such that the core and coil are entirely concentric to minimize size and weight. The permanent magnet 425 is glued to the back of the chassis 418 of the moveable assembly 350. The fixed position chassis 410 supports the coil 423 and bobbin core 421 of the electromagnet in close proximity to the moveable permanent magnet 425.

The core 421 may consist of any appropriate light weight material. When there is no current through the coil 423, the resilient nature of the mylar film strip 415 causes the assembly 350 to return to its rest position (vertical position as shown in FIG. 12). When a current is introduced through the coil 423, interaction between magnetic fields of the coil and the permanent magnet 425 creates a force causing the magnet 425 (with the attached assembly 350) to move from an equilibrium position, either toward or away from the bobbin and coil. As a result of such motion, a spring force is produced by the MYLAR strip 415 which is trying to bring the permanent magnet 425 and the assembly 350 back to the vertical rest position. Reversing the polarity of the applied current will reverse the directions of the magnetic force. Therefore, if the current applied to the coil 423 takes the form of a cyclical AC signal, such as a sign wave, a pulse signal, a triangular wave, etc., the induced magnetic forces will produce an oscillatory movement of the permanent magnet 425 and the attached objective condenser lens 311 within the moveable assembly 350 in the front to back direction of FIG. 12.

Figure 14:
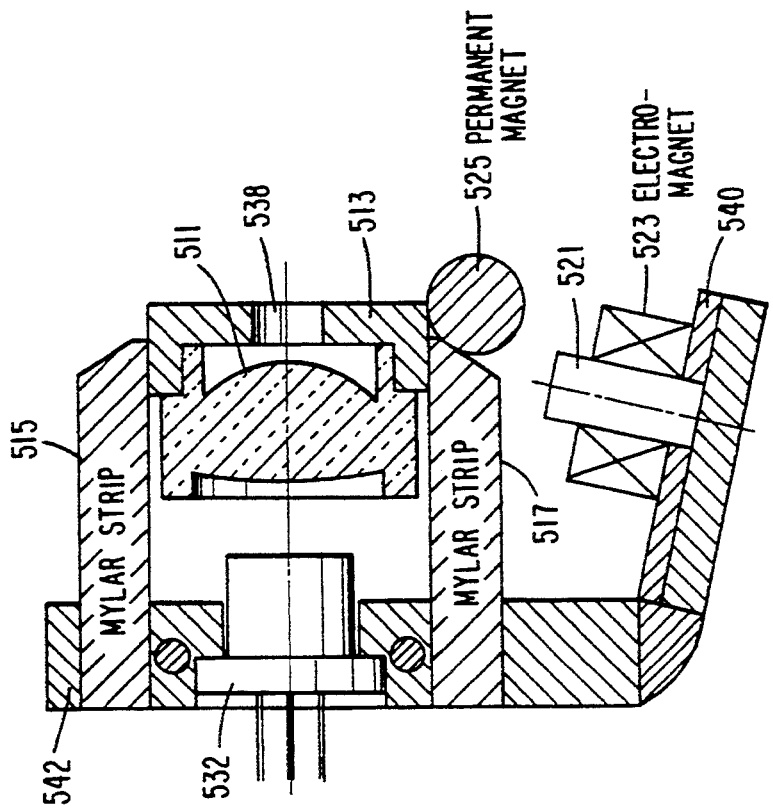
FIG. 14 is a cross-sectional view taken along line A—A of FIG. 13.
Figure 13:
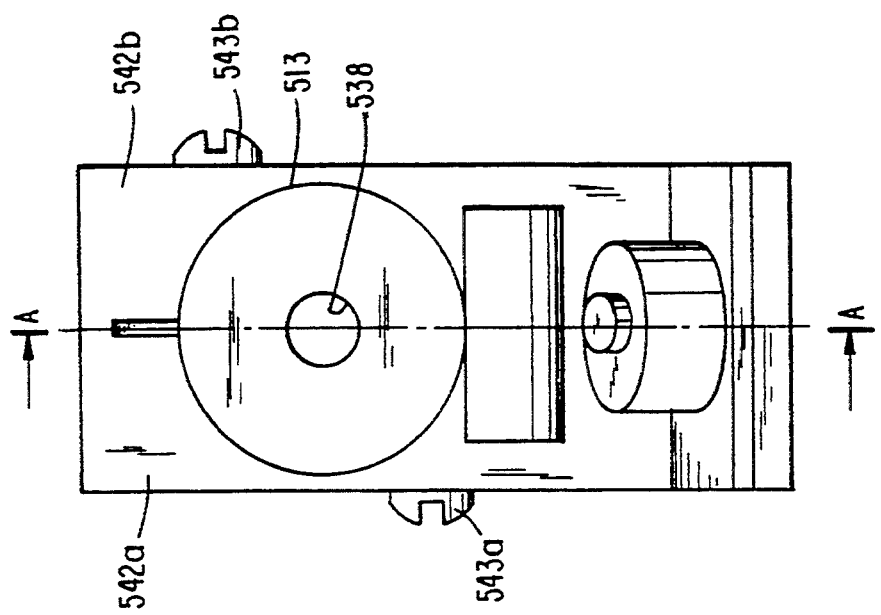
FIG. 13 is a front view of another embodiment of the invention which reciprocates the objective lens through an arc to produce beam scanning, similar to the embodiment shown in FIGS. 12 and 13.

FIGS. 13 and 14 show another embodiment of the invention which is similar to the embodiment shown in FIGS. 9 and 10. The embodiment of FIGS. 13 and 14, however, incorporates a more compact mounting structure. In the embodiment of FIGS. 13 and 14, the laser diode 532 is seated in a laser holder 542, which comprises two aluminum plates 542a and 542b. Screws 543a and 543b clamp the plates 542a and 542b together around diode 532. The screws 543a and 543b also clamp the mylar films 515 and 517 between the plates 542a and 542b. As a result, the single pair of clamping plates 542a and 542b retain the fixed ends of both flexible mylar strips and retain the laser diode. A lens holder 513 is glued to the opposite ends of the mylar films 515 and 517. The lens holder 513 supports a plastic lens 511. An opening 538 through the lens holder 513 serves as the aperture stop.

The MYLAR film 517 also supports a permanent magnet 525, which is glued to front end of that film and/or to the lens holder 513. A soft-iron core 521 stands on the chassis 540 and serves as a bobbin around which coil 523 is wound. The chassis 540 and the laser holder 542 are glued together. The magnetic field generated by coil 523 during application of an alternate current produces an oscillating force on the permanent magnet 525. This oscillating force causes the magnet 525 and the attached lens 511 and holder 513 to reciprocate with respect to the laser diode 532 retained by holder 542.

It is known that plastic optics are sensitive to temperature change due to the illumination of a laser beam. However, in the structure of FIGS. 13 and 14, the plastic optics move like a fan whenever the laser beam is on. This movement dissipates the heat from the beam to the air.

In the various embodiments of the invention using a flexible film strip, such as MYLAR film, to support the lens for lateral oscillation across the path of the laser beam, a large aperture stop (1.5mm) has been used. The large aperture stop reduces the influence from variations in beam truncation on the throughput of the scan module. Specifically, the large aperture stop guarantees 0.8mw laser power at the two ends of each scan. Smaller aperture stops result in an increase in working range, but result in a reduced signal to noise ratio of the electronic signal. Using a single detector in such embodiments (see, e.g., FIG. 17 also limits performance of the optical readers using the scanning module. The working range could be increased by using a more complicated receiving configuration.

A number of experiments and a detailed optical analysis was conducted to determine the performance of the embodiments of the invention using a flexible film strip, such as mylar film, to support the lens for lateral oscillation across the path of the laser beam. From these experiments and analysis, a number of observations have been drawn as follows.

Figure 15:
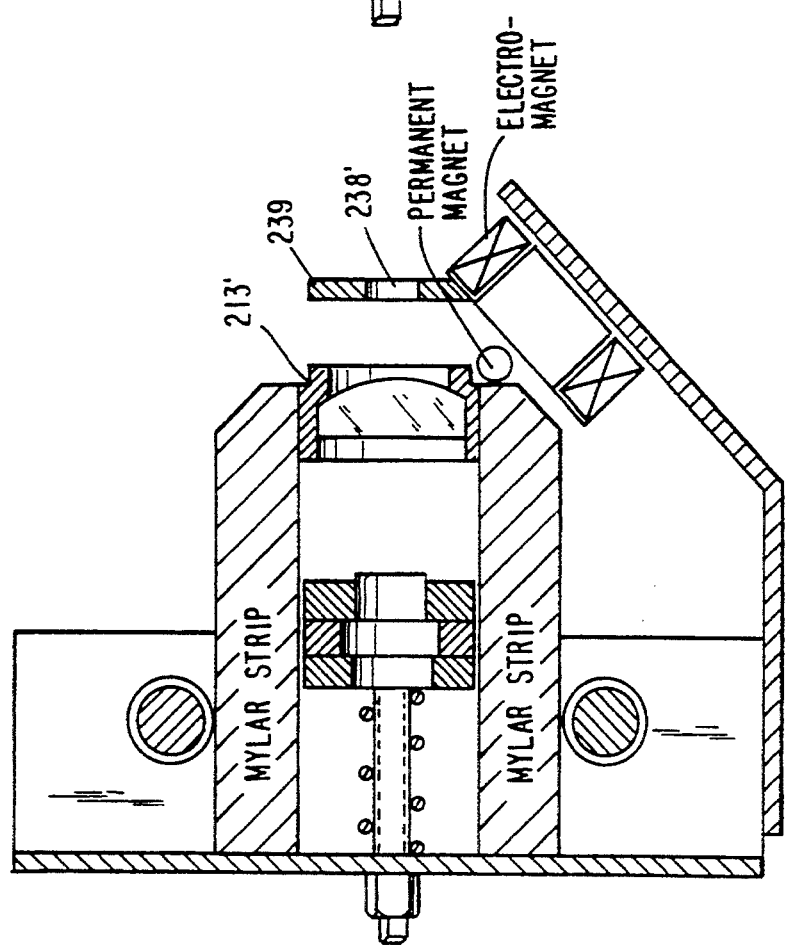

To improve optical performance, the aperture stop can be moved to a fixed position, rather than being formed as part of the lens holder which must be reciprocated with the lens. One advantage of this structure is that the mass of the lens hold becomes smaller. FIG. 15 illustrates a first embodiment using a fixed aperture stop.

The embodiment of FIG. 15 is essentially identical to that shown in FIG. 10. The lens holder 213′, however, is entirely open on the front side and does not include a plate through which the aperture stop is formed. In the embodiment of FIG. 15, a plate 239 is fixedly mounted in front of the moveable lens and lens holder. For example, the bobbin of the electro-magnet might support the plate 239. The aperture stop 238′ for this scanning module is formed through the fixed plate 239.

Optical analysis indicates that the condenser lens is a thick lens with a diameter 15mm and central thickness 4mm. The mass of this lens is greater than 1 g. As the length of the mylar film strips increases from 0.620 inches to 1.1 inches, the linear dimension of the scan module increases 40%. Although the peak of laser irradiance profile and the aperture remain on-axis, the embodiment of FIG. 15 still exhibits 22% variation in the throughput due to the well-known $\cos^4\theta$ law.

Smaller aperture diameter would reduce the resultant on-axis aberrations, however, the off-axis aberrations, such as astigmatism, become large. Some aspherical factor must be introduced to balance the aberrations.

Figure 16:
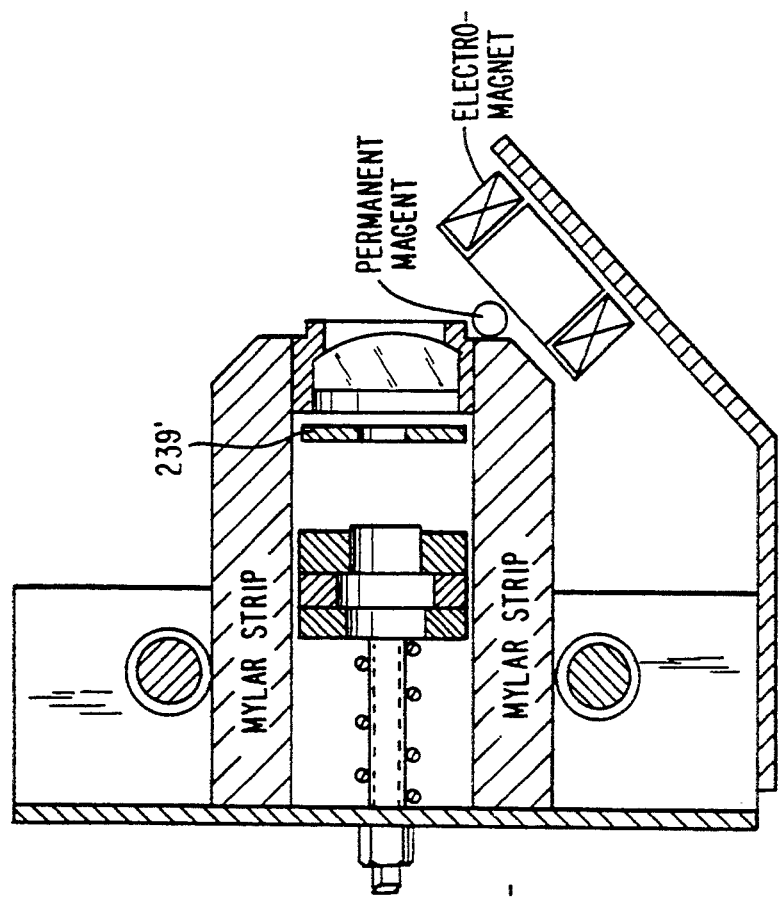
FIGS. 15 and 16 are cross sectional views of embodiments of the invention similar to the embodiment shown in FIG. 10, but using a fixed aperture.

To eliminate the remaining variation of the throughput, the fixed aperture can be positioned behind the lens as shown in FIG. 16. The embodiment of FIG. 16 is identical to that of FIG. 15, discussed above, except that the plate 239′ in which the aperture is formed, is located at a fixed position between the laser diode and the lens.

With the configuration shown in FIG. 16, the peak irradiance of the incident laser beam and the aperture center are always on the same axis regardless of the position of the oscillating lens. Therefore, throughput becomes a constant and attains the maximum value that can be captured by a circular aperture of a fixed size.

In each of the embodiments using a flexible film strip to support a moveable lens, an alternative to the condenser lens would be a fresnel lens. A fresnel lens is typically smaller and therefore would have a smaller mass to move in response to the applied electro-magnetic forces. Other micro-optic elements could also be used as the moveable objective lens.

Figure 17:
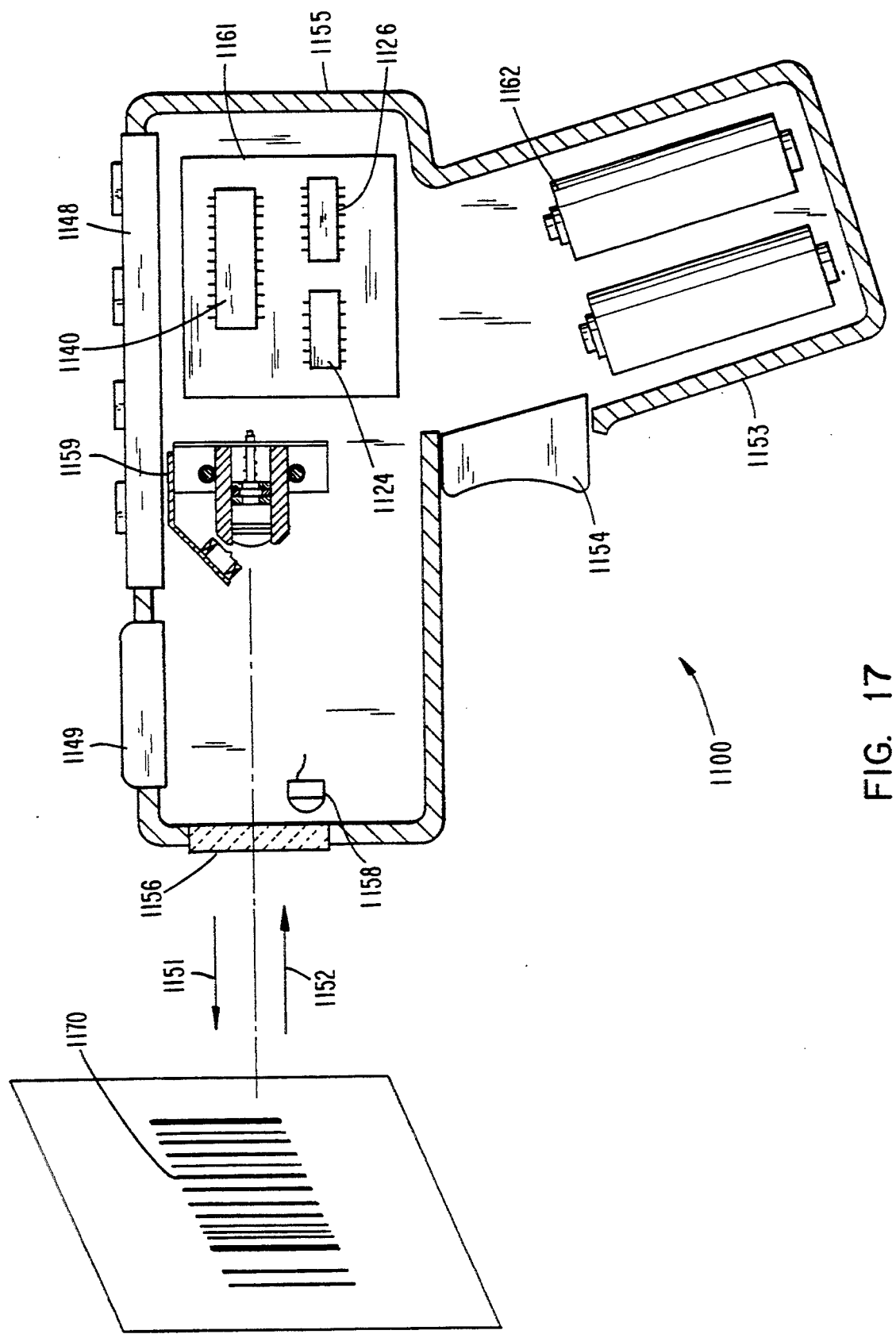
FIG. 17 shows a moving spot optical scanner for reading bar codes, which incorporates a selected embodiment of the scanning module invention.

FIG. 17 shows a gun shaped moving spot optical scanner for reading bar codes. The version illustrated uses a scanning module 1159 corresponding to the embodiment of FIG. 10.

As depicted, the bar code reader unit 1100 comprises a light weight plastic housing 1155 in the shape of a gun having a pistol-grip 1153. A user activates the light beam 1151 from the scanning module 1159 by actuating trigger switch 1154. The gun shaped housing contains the scanning module 1159 which produces the light beam 1151 and a photodetector 1158 for sensing reflected light. Batteries 1162, mounted within the pistol grip 1153 provide power to all elements of the handheld scanner unit 1100.

Printed circuit board 1161 is mounted near the rear of housing 1155. Printed circuit board 1161 contains control circuitry 1124 for producing the signals to drive the laser diode and the coil of the electro-magnet in the scanning module 1159 or 1159′. Printed circuit board 1161 also contains signal processing circuitry 1126 and microprocessor circuitry 1140 for converting the analog electrical signal to a digital pulse signal and for deriving data representative of scanned bar code symbols from the digital pulse signal.

A light transmissive window 1156 in the front end of the housing 1155 allows the outgoing light beam 1151 to exit and the incoming light 1152 reflected from symbol 1170 to enter. The reader 1100 is designed such that the user aims the gun shaped device at a bar code symbol from a position at which there is a space between the reader 1100 and symbol 1170. The front of the reader 1100 does not touch the surface on which symbol 1170 is formed. Instead, the operation of the scanning module 1159 causes the beam to scan across the symbol.

The light from the diode within the scanning module 1159 is typically in the visible light portion of the spectrum. As a result, the user can see the light from the source within the module as the beam scans across the surface on which the symbol 1170 is formed. The user employs this visible light to accurately aim the reader 1100 at the symbol.

The reader 1100 may also function as a portable computer terminal, and in such embodiments would include a keyboard 1148 and a display 1149, as described in U.S. Pat. No. 4,409,470.

FIG. 17 shows one moving spot optical scanners for reading bar codes incorporating three selected embodiments of the scanning modules disclosed herein. The various scanning modules disclosed herein each can be used in the disclosed configuration or in a wide variety of other optical scanner configurations.

Clearly, the mirrorless scanners of the present invention provide a particularly small, light weight, durable, optical scanner. By appropriate selection of focal length, deflection angle and distance between the lens and the information surface, the objective lens scanning automatically compensates for variations in beam spot size.

What is claimed is:

1. A mirrorless optical scanning device for reading optically encoded indicia having varying light reflectivity comprising:
   a light emitter for emitting light from a front section thereof;
   an objective lens for focusing light from the emitter on a surface to be scanned;
   a detector responsive to light reflected back from the surface for detecting variations in intensity of the reflected light;
   a flexible member for movably mounting the objective lens in front of the light emitter, said flexible member permitting lateral movement of the objective lens with respect to light from the light emitter; and
   scanning means for laterally oscillating the objective lens during concurrent emission of light by the light emitter and operation of said detector.

2. A mirrorless optical scanning device as in claim 1, wherein the flexible member comprises at least one flat flexible strip, with one end secured to a fixed point and the objective lens attached to an edge of the at least one flexible strip at a moveable end of the at least one flat flexible strip.

3. A mirrorless optical scanning device as in claim 2, wherein the at least one flexible strip comprises a flat strip of polyester material.

4. A mirrorless optical scanning device as in claim 2, wherein the at least one flexible strip comprises two flexible strips connected to opposite sides of the objective lens.

5. A mirrorless optical scanning device as in claim 4, wherein the light emitter is a visible laser diode mounted between the two flexible strips.

6. A mirrorless optical scanning device as in claim 1, wherein the objective lens comprises a condenser lens.

7. A mirrorless optical scanning device as in claim 1, further comprising means for decoding said variations in intensity of the reflected light during scanning.

8. A mirrorless optical scanning device as in claim 1, wherein the scanning means comprises:
   a permanent magnet fixedly coupled to the objective lens movably mounted by said flexible member; and
   an electromagnet held in a fixed position in proximity to the permanent magnet, such that when an alternative current signal is applied to the electromagnet it produces a magnetic field which acts on the permanent magnet to oscillate the objective lens.

9. A mirrorless optical scanning device as in claim 1, further comprising:
   deflectable means for mounting the flexible member and the objective lens to allow reciprocal movement thereof, wherein the lateral movement provided by the flexible member is in a first direction and the reciprocal movement provided by the deflectable means is in a second direction different from the first direction; and
   means for reciprocally moving the objective lens in the second direction, such that the light scans across the surface in two dimensions.

10. A mirrorless optical scanning device as in claim 9, wherein the means for reciprocally moving the objective lens in a second direction comprise:
    a permanent magnet fixedly coupled to the deflectable means; and
    an electromagnet held in a fixed position in proximity to the permanent magnet, such that when an alternating current signal is applied to the electromagnet it produces a magnetic field which acts on the permanent magnet to reciprocate the deflectable means and the objective lens in the second direction.

11. A mirrorless optical scanning device as in claim 10, wherein the light emitter is fixedly coupled to the deflectable means such that the light emitter reciprocates in the second direction.

12. A mirrorless optical scanning device as in claim 10, wherein the flexible means and the deflectable means each comprise at least one flexible strip.

13. A mirrorless optical scanning device as in claim 12, wherein the at least one flexible strip of the flexible means and the deflectable means each comprise a flat strip of polyester material.

14. A mirrorless optical scanning device as in claim 1, further comprising means for defining an aperture stop, said means for defining an aperture stop limiting the amount of the light from the emitter which impacts on the surface to be scanned.

15. A mirrorless optical scanning device as in claim 14, wherein the means for defining an aperture stop comprise an aperture attached to the flexible member for movably mounting the objective lens, such that the aperture reciprocates together with the objective lens.

16. A mirrorless optical scanning device as in claim 15, wherein the aperture is attached to the flexible member for movably mounting the objective lens at a position in front of the objective lens.

17. A mirrorless optical scanning device as in claim 14, wherein the means for defining an aperture stop comprise an aperture mounted at a fixed position with respect to the light emitter.

18. A mirrorless optical scanning device as in claim 17, wherein the fixed position of the aperture is in front of the objective lens.

19. A mirrorless optical scanning device as in claim 17, wherein the fixed position of the aperture is between the front of the light emitter and the objective lens.

20. A mirrorless optical scanning device for reading optically encoded indicia having varying light reflectivity comprising:
    a light emitter for emitting light from a front section thereof;
    an objective lens for focusing light from the emitter on a surface to be scanned;
    a detector responsive to light reflected back from the surface for detecting variations in intensity of the reflected light;

at least one flexible strip, a first end of the at least one flexible strip being attached to the objective lens such that the at least one flexible strip movably supports the objective lens in front of the light emitter and allows lateral movement of the objective lens with respect to light from the light emitter;

means for securing a second end of the at least one flexible strip at a position which is fixed with respect to the light emitter; and scanning means for laterally oscillating the objective lens during concurrent emission of light by the light emitter and operation of said detector means.

21. A mirrorless optical scanning device as in claim 20, wherein the means for securing comprise a pair of plates with the second end of the at least one flexible strip sandwiched therebetween, and means to apply a compressive force to the pair of plates.

22. A mirrorless optical scanning device as in claim 21, wherein the light emitter is positioned between and retained by the pair of plates.

23. A mirrorless optical scanning device as in claim 20, further comprising means for decoding said variations in intensity of the reflected light during scanning.

24. A device for reading optically encoded indicia having varying light reflectivity, comprising:

a light emitting and scanning module for generating a laser beam and scanning said laser beam across a surface on which said optically encoded indicia having varying light reflectivity is formed;

detector means for receiving light reflected back from the optically encoded indicia and producing electrical signals corresponding to the varying light reflectivity, wherein the light emitting and scanning module comprises:

a light for emitting light from a front section thereof;

an objective lens for focusing light from the emitter on a surface to be scanned;

flexible member for movably mounting the objective lens in front of the light emitter said flexible member permitting lateral movement of the objective lens with respect to light from the light emitter; and scanning means for laterally oscillating the objective lens during concurrent emission of light by the light emitter to cause the light to scan the surface and operation of said detector means.

25. A device as in claim 24, wherein the flexible member comprises at least one flat flexible strip, with one each secured to a fixed point and the objective lens attached to an edge of the at least one flexible strip at a movable end of the at least one flat flexible strip.

26. A device as in claim 25, wherein the at least one flexible strip comprises a flat strip of polyester material.

27. A device as in claim 25, wherein the at least one flexible strip comprises two flexible strips connected to opposite sides of the objective lens.

28. A device as in claim 24, further comprising means for defining an aperture stop, said means for defining an aperture stop limiting the amount of the light from the emitter which impacts on the surface to be scanned.

29. A device as in claim 28, wherein the means for defining an aperture stop comprise an aperture attached to the flexible member for movably mounting the objective lens, such that the aperture reciprocates together with the objective lens.

30. A device as in claim 28, wherein the aperture is attached to the flexible member for movably mounting the aperture stop at a position in front of the objective lens.

31. A device as in claim 28, wherein the means for defining an aperture stop comprise an aperture mounted at a fixed position with respect to the light emitter.

32. A device as in claim 31, wherein the fixed position of the aperture is in front of the objective lens.

33. A device as in claim 31, wherein the fixed position of the aperture is between the front of the light emitter and the objective lens.

34. A device as in claim 24, further comprising:

deflectable means for mounting the flexible member and the objective lens to allow reciprocal movement thereof, wherein the lateral movement provided by the flexible member is in a first direction and the reciprocal movement provided by the deflectable means is in a second direction different from the first direction; and means to reciprocally move the objective lens in the second direction, such that the light scans across the surface in two dimensions.

35. A device as in claim 24, further comprising means for decoding said variations in intensity of the reflected light during scanning.

36. A device for reading optically encoded indicia having varying light reflectivity, comprising:

a light emitting and scanning module for generating a laser beam and scanning said laser beam across a surface on which said optically encoded indicia having varying light reflectivity is formed;

detector means for receiving light reflected back from the optically encoded indicia and producing electrical signals corresponding to the varying light reflectivity, wherein the light emitting and scanning module comprises:

a light emitter for emitting light from a front section thereof;

an objective lens for focusing light from the emitter on a surface to be scanned;

at least one flexible strip, one end of the at least one flexible strip being attached to the objective lens such that at least one flexible strip movably supports the objective lens in front of the light emitter and allows lateral movement of the objective lens with respect to light from the light emitter;

means for securing another end of the at least one flexible strip at a position which is fixed with respect to the light emitter;

scanning means for laterally oscillating the objective lens during concurrent emission of light by the light emitter to cause light focused by the objective lens to scan across a portion of the surface and operation of said detector means.

37. A device as in claim 36, wherein the means for securing comprise a pair of plates with the another end of the at least one flexible strip sandwiched therebetween, and means to apply a compressive force to the pair of plates.

38. A device as in claim 37, wherein the light emitter is positioned between and retained by the pair of plates.

39. A device as in claim 36, further comprising means for decoding said variations in intensity of the reflected light during scanning.

* * * * *